United States Patent [19]

Gelinas

[11] 4,429,280

[45] Jan. 31, 1984

[54] APPARATUS AND METHOD FOR DEMODULATION OF A MODULATED CURL-FREE MAGNETIC VECTOR POTENTIAL FIELD

[75] Inventor: Raymond C. Gelinas, Concord, Mass.

[73] Assignee: Honeywell Inc., Minneapolis, Minn.

[21] Appl. No.: 198,325

[22] Filed: Oct. 20, 1980

[51] Int. Cl.$^3$ .............................................. H03D 1/00
[52] U.S. Cl. .................................................... 329/200
[58] Field of Search ................... 329/200, 203, 205 R, 329/207; 324/248, 83 D; 332/51 R, 51 H; 455/39, 41

[56] References Cited

U.S. PATENT DOCUMENTS

| | | | |
|---|---|---|---|
| 3,363,200 | 1/1968 | Jaklevic et al. | 332/51 R |
| 3,733,526 | 5/1973 | Amacher et al. | 317/234 R |
| 4,070,618 | 1/1978 | Thomas | 324/83 D X |

OTHER PUBLICATIONS

Rosen et al., "Magnetic Recordings of the Heart's Electrical Activity with a Cryogenic Magnetometer," Journal of Applied Physics, vol. 42, #10, Sep. 71, pp. 3682-3684.

R. P. Feynmar, R. B. Leighton, M. Sands, The Feynman Lectures on Physics–Quantum Mechanics, Addison Wesley Press pp. 15-6 through 15-14 and pp. 21-1 through 21-19.

R. C. Jaklevic, J. Lambe, J. E. Mercereau and A. H. Silver. Macroscopic Quantum Interference in Superconductors. Physical Review, vol. 140, No. 5A Nov. 29, 1965–pp. A1628 through A1637.

Y. Aharonou and D. Bohm—Significance of Electromagnetic Potentials in the Quantum Theory. Physical Review vol. 115 No. 3, Aug. 1, 1959, pp. 485 through 491.

Y. Aharonou and D. Bohm—Further Considerations on Electromagnetic Potentials in the Quantum Theory, Physical Review vol. 123, No. 4 Aug. 15, 1961 pp. 1511 through 1524.

B. D. Josephson—Coupled Superconductors—Reviews of Modern Physics, Jan. 1964—pp.216 through 220.

Primary Examiner—Siegfried H. Grimm
Assistant Examiner—Edward P. Westin
Attorney, Agent, or Firm—W. W. Holloway, Jr.; J. P. Sumner; A. Medved

[57] ABSTRACT

A system for determining the modulation imposed on a curl-free magnetic vector potential field. The system includes apparatus for detecting the curl-free magnetic vector potential field component by means of a Josephson junction. The magnetic vector potential field interacts with the Josephson junction by varying the phase of the argument of the sine function which determines the Josephson junction current. The output signals of the Josephson junction are coupled to apparatus that can determine the modulation of the detected field. Because the magnitude of the change in the detected curl-free vector potential field causes a proportional change in the phase of the Josephson junction current, the modulation of the field can be established.

6 Claims, 12 Drawing Figures

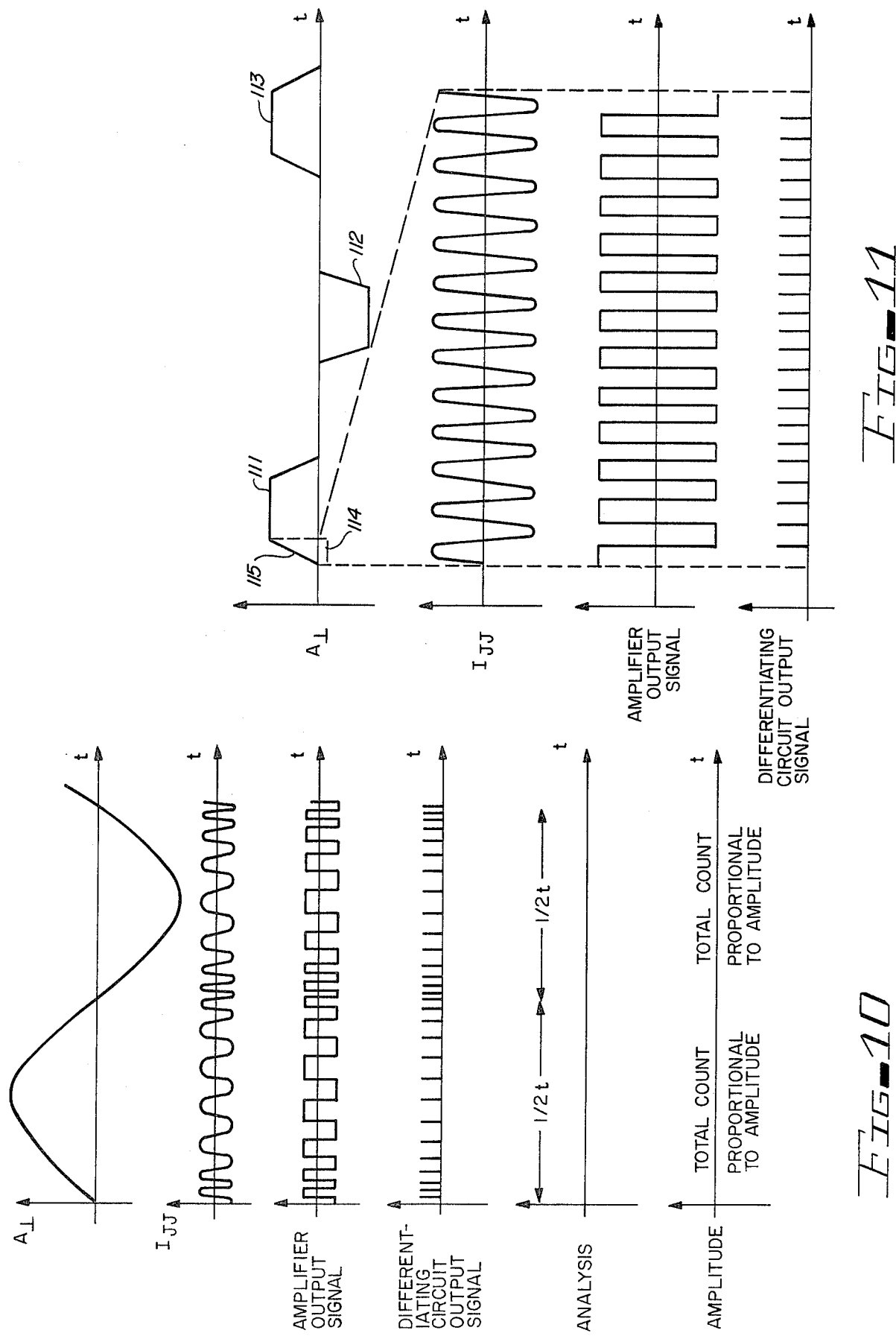

4,429,280

APPARATUS AND METHOD FOR DEMODULATION OF A MODULATED CURL-FREE MAGNETIC VECTOR POTENTIAL FIELD

RELATED APPLICATIONS

Apparatus and Method for Transfer of Information by Means of a Curl-Free Magnetic Vector Potential Field invented by Raymond C. Gelinas, Ser. No. 198,324, filed on Oct. 20, 1980 and assigned to the same assignee as named herein.

Apparatus and Method for Distance Determination by Means of a Curl-Free Magnetic Vector Potential Field, invented by Raymond C. Gelinas, Ser. No. 198,326, filed on Oct. 20, 1980 and assigned to the same assignee as named herein.

Apparatus and Method for Direction Determination by Means of a Curl-Free Magnetic Vector Potential Field, invented by Raymond C. Gelinas, Ser. No. 198,553, filed on Oct. 20, 1980 and assigned to the same assignee as named herein.

Apparatus and Method for Modulation of a Curl-Free Magnetic Vector Potential Field, invented by Raymond C. Gelinas, Ser. No. 198,380, filed on Oct. 20, 1980 and assigned to the same assignee as named herein.

BACKGROUND OF THE INVENTION

1. Field of the Invention

This invention relates generally to the transfer of information by means of an electromagnetic field, and more particularly to the apparatus for demodulation of the curl-free magnetic vector potential field.

2. Description of the Prior Art

It is known in the prior art to provide systems for the transfer of information utilizing electromagnetic fields which are solutions to Maxwell's equations. The information transfer systems include apparatus for generating modulated electromagnetic fields and apparatus for detecting and demodulating the generated electromagnetic fields. Examples of the prior type information transfer systems include radio and television band-based systems, microwave band-based systems and optical band-based systems.

The Maxwell equations, which govern the prior art transfer of information by electromagnetic fields can be written:

$$\text{CURL } \overline{E} + \frac{\partial \overline{B}}{\partial t} = 0 \qquad 1.$$

$$\text{CURL } \overline{H} - \frac{\partial \overline{D}}{\partial t} = \overline{J} \qquad 2.$$

$$\text{DIV } \overline{B} = 0 \qquad 3.$$

$$\text{DIV } \overline{D} = \rho \qquad 4.$$

where $\overline{E}$ is the electric field density, $\overline{H}$ is the magnetic field intensity, $\overline{B}$ is the magnetic flux density, $\overline{D}$ is the electric displacement, $\overline{J}$ is the current density and $\rho$ is the charge density. In this notation the bar over a quantity indicates that this is a vector quantity, i.e., a quantity for which a spatial orientation is required for complete specification. The terms CURL and DIV refer to the CURL and DIVERGENCE mathematical operation and are denoted symbolically by the $\nabla \times$ and $\nabla \circ$ mathematical operators respectively. Furthermore, the magnetic field intensity and the magnetic flux density are related by the equations $\overline{B} = \mu \overline{H}$, while the electric field density and the electric displacement are related by the equation $\overline{D} = \epsilon \overline{E}$. These equations can be used to describe the transmission of electromagnetic radiation through a vacuum or through various media.

It is known in the prior art that solutions to Maxwell's equations can be obtained throught the use of electric scalar potential functions and magnetic vector potential functions. The electric scalar potential is given by the expression:

$$\phi(1) = \frac{1}{4\pi\epsilon_o} \int \frac{\rho(2)}{r_{12}} dv(2) \qquad 5.$$

where $\phi(1)$ is the scalar potential at point 1, $\rho(2)$ is the charge density at point 2, $r_{12}$ is the distance between point 1 and 2, and the integral is taken over all differential volumes. The magnetic vector potential is given by the expression:

$$\overline{A}(1) = \frac{1}{4\pi\epsilon_o C^2} \int \frac{\overline{J}(2)}{r_{12}} dv(2) \qquad 6.$$

where $A(1)$ is the vector potential at point 1, $\epsilon_o$ is the permittivity of free space, C is the velocity of light, $J(2)$ is the (vector) current density at point 2, $r_{12}$ is the distance between point 1 and point 2 and the integral is taken over all differential volumes $dv(2)$. The potential functions are related to Maxwell's equations in the following manner:

$$\overline{E} = -\text{GRAD } \phi - \frac{\partial \overline{A}}{\partial t} \qquad 7.$$

where GRAD is the gradient mathematical operation and is denoted symbolically by the $\nabla$ mathematical operator:

$$\overline{B} = \text{CURL } \overline{A} \qquad 8.$$

where $\overline{A}$ can contain, for completeness, a term which is the gradient of a scalar function. In the remaining discussion, the scalar function and the scalar potential function will be taken to be substantially zero. Therefore, attention will be focused on the magnetic vector potential $\overline{A}$.

In the prior art literature, consideration has been given to the physical significance of the magnetic vector potential field A. The magnetic vector potential field was, in some instances, believed to be a mathematical artifice, useful in solving problems, but devoid of independent physical significance.

More recently, however, the magnetic vector potential has been shown to be a quantity of independent physical significance. For example, in quantum mechanics, the Schroedinger equation for a (non-relativistic, spinless) particles with charge g and mass m moving in an electromagnetic field is given by $$-\frac{\hbar}{g} \frac{\partial \psi}{\partial t} = \qquad 9.$$

$$\frac{1}{2m} \left( \frac{\hbar}{i} \text{GRAD} - g\overline{A} \right) \left( \frac{\hbar}{i} \text{GRAD} - g\overline{A} \right) \psi + g\phi\psi$$

where $\hbar$ is Planch's constant divided by $2\pi$, $i$ is the imaginary number $\sqrt{-1}$, $\phi$ is the electric scalar potential experienced by the particle, A is the magnetic scalar potential experienced by the particle and $\chi$ is the wave function of the particle. Thus, devices such as the Josephson junction device quantum mechanical effects can be used to detect the presence of curl-free magnetic vector potential. In order to provide a system for transfer of information using the curl-free magnetic vector potential, apparatus for demodulating the modulated curl-free vector potential field must be designed to provide for the physical differences between the typical electromagnetic field generally used in communications and the curl-free magnetic vector potential field.

OBJECTS OF THE INVENTION

It is therefore an object of the present invention to provide an improved system for transfer of information.

It is a further object of the present invention to provide apparatus demodulation of a modulated curl-free vector potential field.

It is a more particular object of the present invention to provide apparatus for detection of the curl-free vector potential field and apparatus for analyzing output signals of the detection apparatus.

It is another particular object of the present invention to provide apparatus for demodulating the output signals of a Josephson junction, the Josephson junction used to detect the curl-free magnetic vector potential field.

SUMMARY OF THE INVENTION

The aforementioned and other objects are accomplished, according to the present invention, by apparatus for detecting a magnetic vector potential field having a substantial curl-free component (i.e., CURL $\overline{A}=0$) and by apparatus coupled to the detection apparatus for demodulation of signals produced by the detection apparatus. An example of a detector of curl-free magnetic vector potential fields is the Josephson junction. The intention of the curl-free magnetic vector potential field on the Josephson junction results in a change in the phase of the current, $I_{JJ}$, flowing through the junction. The demodulation system converts the Josephson junction current phase changes into quantities directly related to the modulation of the field.

These and other features of the present invention will be understood upon reading of the following description along with the drawings.

BRIEF DESCRIPTION OF THE DRAWINGS

FIG. 10 illustrates the method of operation for demodulating a strong amplitude-modulated curl-free magnetic vector potential field.

FIG. 11 illustrates the method of operation for demodulating a strong curl-free magnetic vector potential field with arbitrary modulation.

DESCRIPTION OF THE PREFERRED EMBODIMENT

1. Detailed Description of the Figures

Figure 1:
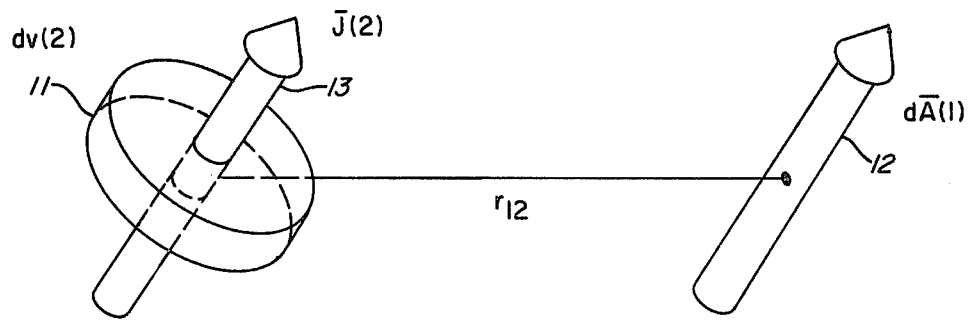
FIG. 1 is a schematic diagram illustrating the procedure for determining a magnetic vector potential at a point.

Referring to FIG. 1, the method of determining the magnetic vector potential field $\overline{A}(1)$ 12 (i.e., at point 1) is illustrated. Referring to equation 6, the contribution by the differential volume element at point 2, dv(2), 11, having a current density $\overline{J}(2)$ associated therewith is given by $$d\overline{A}(1) = \frac{1}{4\pi\epsilon_o C^2} \frac{\overline{J}(2)}{r_{12}} dv(2) \qquad 10.$$

To obtain equation 6, equation 10 must be integrated. Equations 6 and 10 are valid where $\overline{J}$ is not a function of time.

Figure 2:
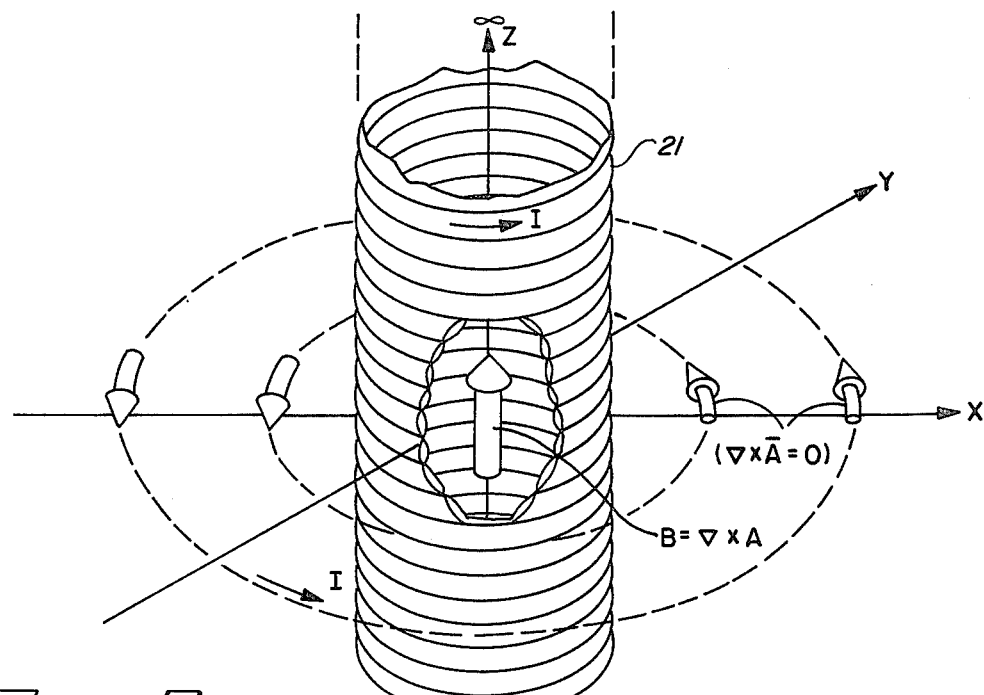
FIG. 2 is a schematic diagram illustrating the generation of a curl-free magnetic vector potential field using an infinite solenoid.

Referring to FIG. 2, an example of current configuration producing a substantial component of curl-free magnetic vector potential field is shown. Conductors carrying a current I are wrapped in a solenoidal configuration 21 extending a relatively great distance in both directions along the z-axis. Within solenoid 21, the magnetic flux density $\overline{B}=\text{CURL } \overline{A}$ is a constant directed along the z-axis with a value $$\overline{B} = B_z = \frac{nI}{\epsilon_o C^2} \qquad 11.$$

where n is the number of conductors per unit length. Outside of the solenoid, it can be shown that the components of $\overline{A}$ 23 are $$A_x = \frac{nIa^2}{2\epsilon_o C^2} \frac{y}{x^2+y^2} \qquad 12.$$

$$A_y = \frac{nIa^2}{2\epsilon_o C^2} \frac{x}{x^2+y^2} \qquad 13.$$

$$A_z = 0 \qquad 14.$$

where a is the radius of the solenoid. It can be shown that CURL $\overline{A}=0$ for the vector potential field.

Figure 3:
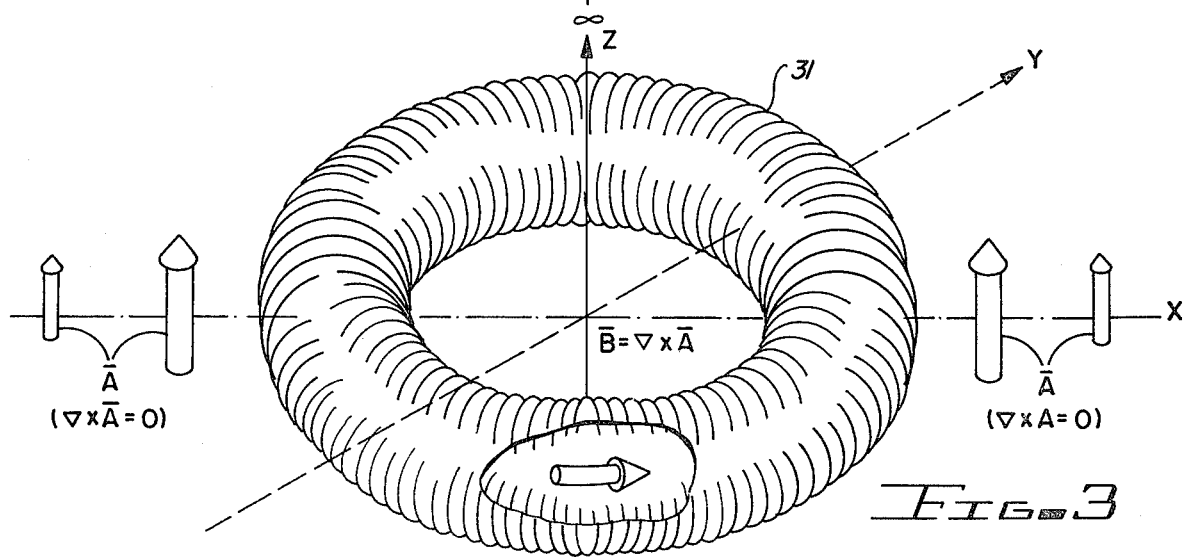
FIG. 3 is a schematic diagram illustrating the generation of a curl-free magnetic vector potential field using a toroidal configuration.

Referring to FIG. 3, another example of a current geometry generating magnetic vector potential field with a substantial curl-free component is shown. In this geometry the current carrying conductors are wrapped uniformly in toroidal configuration 31. Within the toroidal configuration, the magnetic flux, $\overline{B}=\text{CURL}\ \overline{A}$ and the magnetic flux, is contained substantially within the torus. In the region external to the torus, $\overline{B}=\text{CURL}\ \overline{A}=0$ and the orientation of the magnetic vector potential field is parallel the axis of the torus.

Figure 4A:
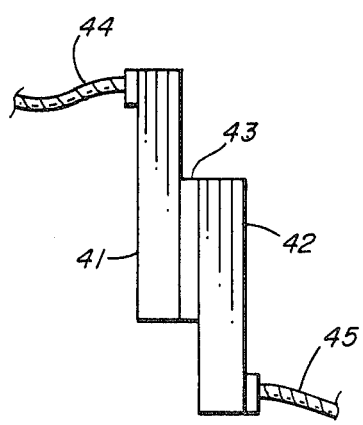
FIG. 4a is a cross-sectional diagram of a Josephson junction.
Figure 4B:
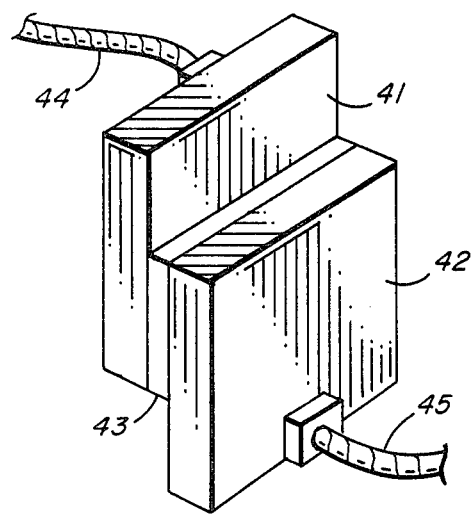
FIG. 4b is a perspective drawing of a Josephson junction.
Figure 7:
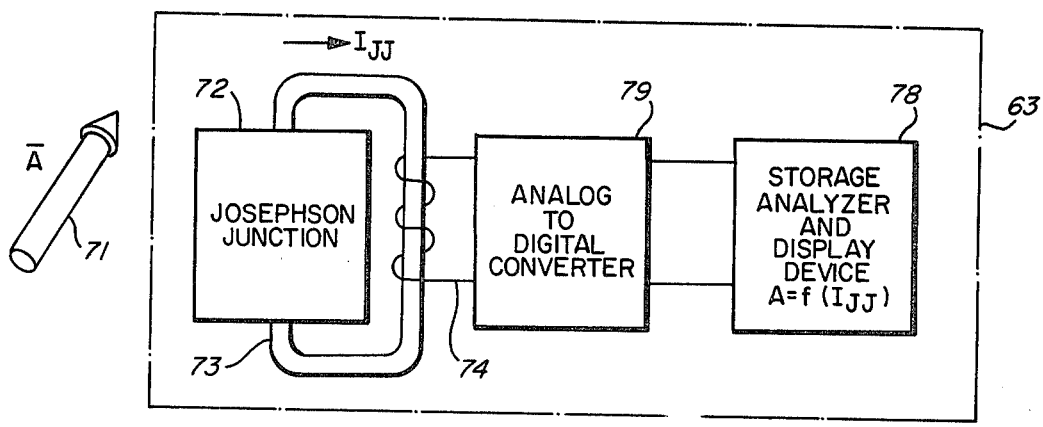
FIG. 7 is a schematic diagram of apparatus for demodulating a weak curl-free magnetic vector potential field.

Referring to FIG. 4a and FIG. 4b, a detector capable of detecting the curl-free component of the magnetic vector potential field is shown. This detector is referred to as a Josephson junction device. The Josephson junction consists of a first superconducting material 41 and a second superconducting material 42. These two superconducting materials are separated by a thin insulating material 43. Superconducting material 41 and super conducting material 42 are electrically coupled to other apparatus by conductor 44 and conductor 45 respectively. In the simplest configuration, conductor 44 and conductor 45 are superconduction materials and are coupled together as shown in FIG. 7, element 73. According to classical electromagnetic theory, the insulating material 43 will prevent any substantial conduction of electrons between the two superconducting regions. However, guantum theory predicts, and experiments verify that conduction can take place through the insulating material. The result of this conduction is a net current $$I_{JJ} = K \sin\left(\delta o + \frac{2e}{\hbar} \int \overline{A} \cdot d\overline{s} + \frac{e}{\hbar} Vt\right)$$ 15.

where the magnitude of the current K and the phase $\delta o$ are determined by intrinsic properties of the junction device, e is the charge of the electron, A is an externally applied magnetic vector potential, ds is a differential element extending from one superconducting element to the other superconducting element and V is an externally applied voltage.

Figure 5:
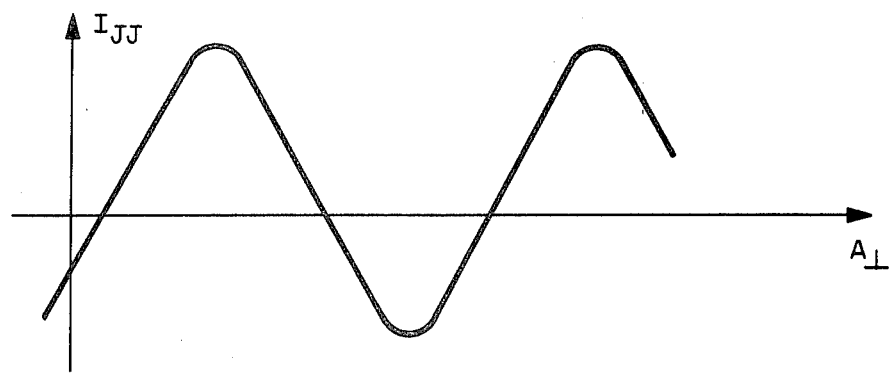
FIG. 5 is a diagram of the current flowing in a Josephson junction as a function of field perpendicular to the junction surface.

Referring to FIG. 5, the relationship of the Josephson junction device current $I_{JJ}$ as a function of externally applied magnetic vector potential field component $A_1$ (i.e., the component perpendicular to the plane of the Josephson junction) is shown. The integral $\int \overline{A} \cdot d\overline{s}$ as $\overline{A}$ is increased, results in a change of phase for $I_{JJ}$. This change in phase produces the oscillating behavior for $I_{JJ}$ as a function of a magnetic vector potential field perpendicular to the Josephson junction. This relationship will hold as long as there is no externally applied voltage to the Josephson junction (i.e., V=0).

Figure 6:
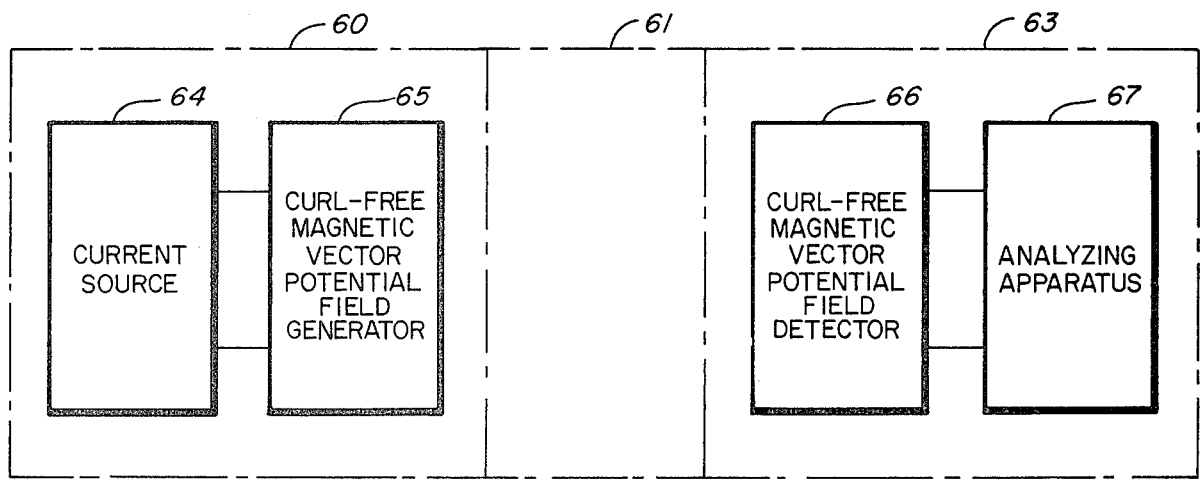
FIG. 6 is a schematic diagram of a system for using a magnetic curl-free vector potential field for transmission of information.

Referring next to FIG. 6, a system for the transfer of information using a curl-free vector potential field is shown. Apparatus 60 is comprised of a current source 64 and apparatus 65 configured to generate a magnetic vector potential field having a substantial curl-free component using the current from the current source. The magnetic vector potential field is established in the intervening media 61 and impinges upon a magnetic vector potential field detector 66. The property of detector 66 indicating the presence of a magnetic vector potential field is analyzed in apparatus 67 for information content.

Figure 8:
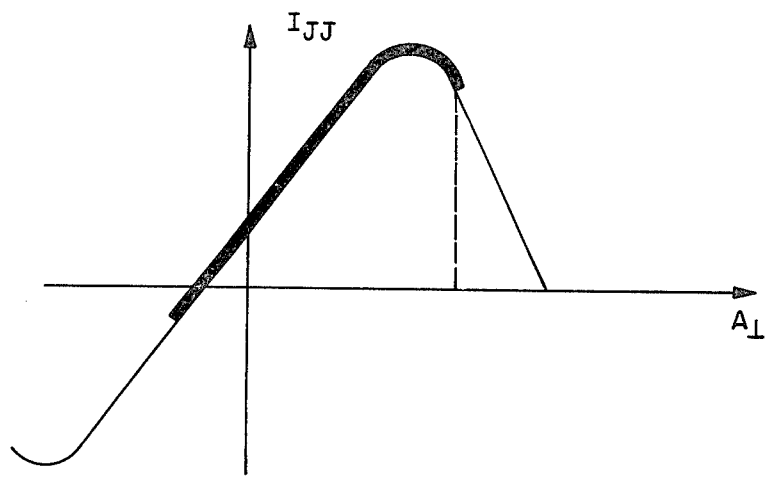
FIG. 8 illustrates the method of operation of apparatus for demodulating a weak curl-free magnetic vector potential field.

Referring to FIG. 7 and FIG. 8, apparatus for demodulating a weak curl-free magnetic vector potential field is illustrated. A weak curl-free magnetic vector potential field is one for which the maximum amplitude of the field results in a relatively minor change in phase. The component perpendicular to Josephson junction 72 of curl-free vector potential field 71 $A_1$ causes a change in phase of Josephson junction current, $I_{JJ}$ flowing in conductor 73. The change in current $I_{JJ}$ is applied through transfer means 74 to analog-to-digital converter 79. The resulting digitalized signal is applied to storage analyzer and display device 78. Device 78 has stored therein calibration data which relates the perpendicular component of appliance vector potential field A to the resulting Josephson junction current $I_{JJ}$, (i.e., $A=f(I_{JJ})$). In essence, the relationship illustrated by FIG. 5 is available to convert the resulting Josephson junction current I to a quantity related to $\overline{A}$. Thus it is possible to reconstruct the magnitude of the impinging magnetic vector field potential and the modulation can be extracted therefrom.

Figure 9:
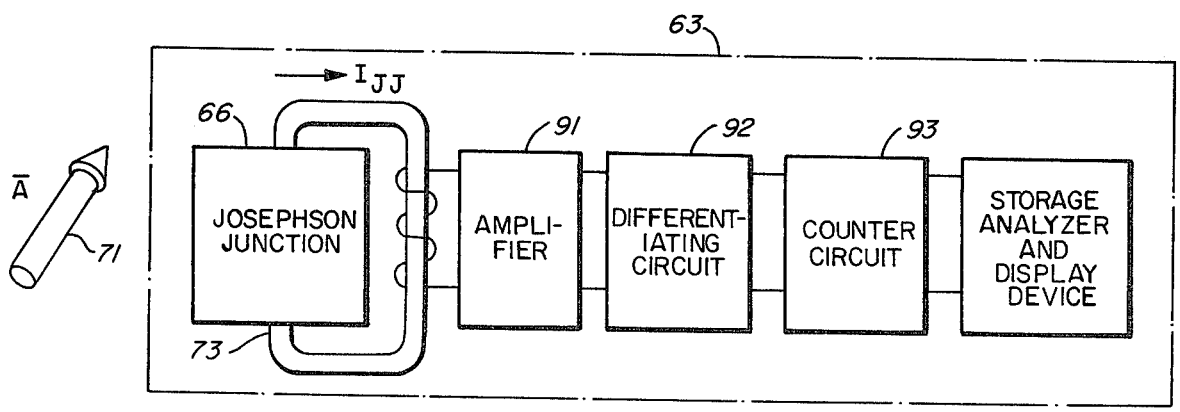
FIG. 9 is a schematic diagram of apparatus for demodulating a strong curl-free magnetic vector potential field.

Referring next to FIG. 9, the schematic diagram of apparatus for demodulation strong curl-free vector potential fields is shown. The strong field apparatus is used when the impinging magnetic vector potential field results in multiple phase changes for the Josephson junction current. The weak field apparatus has response too slow to determine effectively the magnitude of the vector potential field. The change in component perpendicular to the Josephson junction 72 of the curl-free vector potential field causes a change in the Josephson junction current $I_{JJ}$ flowing in conductor 73. Transfer means 74 causes a signal related to $I_{JJ}$ to be applied to overdriven amplifier 91. The output signal from amplifier 91, essentially a series of square waves, is applied to differential circuit 92. The output signal from circuit 92 is applied to counter 93 and the resulting counts are stored in storage, analyzer and display circuit 94. The result of using this apparatus on an amplitude modulated sinewave signal is shown in FIG. 10. In FIG. 11, the result of using this apparatus to analyze a general curl-free vector potential field signal is shown.

2. Operation of the Preferred Embodiment

When the curl-free magnetic vector potential carries information, the field must vary in a manner so that the information is transmitted therewith. No mention has been made in the previous discussion of the effect of varying the current source. It will be clear, however, that the finite field propagation velocity will cause a delay between a change in the curl-free magnetic vector potential field produced by the generator of the field and the detection of that change by the detector located at a distance from the generator. However, these delay effects are not important for the practice of this invention and will be ignored in this discussion. With respect to curl-free vector potential field generating apparatus, any limitation on the upper limit of generated frequency components imposed will be the result of parameters impacting rapid changes in the current. Thus parameters such as inductance can provide a limit to ability to impose high frequency modulation on the vector potential field.

With respect to the media between the field generating apparatus and the field detecting apparatus, two effects are important. First as implied by equation (1):

$$\text{CURL}\ \overline{E} + \frac{\partial \overline{B}}{\partial t} = \text{CURL}\ \overline{E} + \text{CURL}\ \frac{\partial \overline{A}}{\partial t} =$$ 16.

$$\text{CURL}\left(\overline{E} + \frac{\partial \overline{A}}{\partial t}\right) = 0$$

or

-continued $$\frac{\partial \overline{A}}{\partial t} = -\overline{E} \quad 17.$$

Therefore, as modulation is imposed on the vector potential field, the change in the vector potential field will produce an electric field intensity. The electric field intensity will produce a flow of current in conducting material or a temporary polarization in polarizable material. With respect to materials demonstrating magnetic properties, the bulk magnetic properties are responsive to the magnetic flux density $\overline{B}$. However, $\overline{B} = \text{CURL } \overline{A} = 0$ for the curl-free vector potential field component. Therefore, the interaction of the curl-free magnetic vector potential field is weaker in magnetic materials than is true for the general magnetic vector potential field. Media effects and especially the conductivity of the intervening media will provide a mechanism delaying the achievement of steady state condition for the curl-free magnetic vector potential field (i.e., because $$\frac{\partial \overline{A}}{\partial t} = -\overline{E})$$

and thus causing a media limitation on frequency. A curl-free magnetic vector potential field can be established in materials that are not capable of transmitting normal electromagnetic radiation. The media display problem can be compensated for by lowering the frequency spectrum of the modulation on the curl-free magnetic vector potential field.

With respect to the detector, the Josephson junction can be constructed to provide responses of sufficiently high frequency so that this element of the system is not typically a factor limiting frequency of information transfer.

As indicated in equation 12, the effect of the application of a vector potential field to a Josephson junction, in the absence of a voltage applied to the junction, is to change the phase of the sine function determining the value of the junction current $I_{JJ}$. The excursions from zero magnetic vector potential field can be analyzed and a determination made of the modulation applied to the field. When a voltage is applied to the Josephson junction, oscillation occurs in the $I_{JJ}$ as will be seen from the Vdt term of equation 12. The application of an external vector potential field causes the phase of the oscillation to change. By monitoring the phase change in the Josephson junction oscillations from the modulation of the vector potential field can be inferred.

When a Josephson junction is used in the detection apparatus, the modulated curl-free magnetic vector potential field results in changes in phase for the current which can be analyzed in a manner depending on whether the field influencing the detecting apparatus is a strong field or a weak field.

Considering first the weak curl-free magnetic vector potential field, the modulation for this field can be accomplished by calibrating the detecting apparatus using the relationship of FIG. 5 so that a given current from the Josephson junction can be interpreted in terms of the detected vector potential field.

Considering next the demodulation of a strong curl-free magnetic vector potential field, the use of digital techniques provides a convenient method for analysis. In essence, four pulses are generated for each change of phse of 360°. Pulses will (except for noise signals) be generated only when the magnetic field is varying. Thus, several forms of modulation can be utilized. The length of time a vector field varies, the relative slope of the changing vector field, and the relative height of the vector potential field can all be used as modulating methods.

The presence of pulses can indicate that the vector field is changing, the relative number of pulses during a period of vector field can indicate the relative magnitude of the change, and the relative density of pulse during a vector field change can indicate the relative vector field slope.

In addition, an amplitude modulated signal can be similarly demodulated. In the case of amplitude modulation, however, there can be little reason to use the carrier frequency. To demodulate an amplitude-modulated signal, the time intervals of a high (or low) density of pulses can indicate the frequency of the carrier. The number of pulses between the high (or density) pulse density region can indicate the relative modulation imposed on the signal.

Another method of detection of a magnetic vector potential field utilizes the property that $$\frac{\partial \overline{A}}{\partial t} = -E.$$

Thus, for example, by measuring the changes in a material resulting from the application of the electric field, the magnetic vector potential field causing the electric field can be inferred.

Many changes and modifications in the above-described embodiment of the invention can, of course, be carried out without departing from the scope thereof. Accordingly, the scope of the invention is intended to be limited only by the scope of the accompanying claims.

What is claimed is:

1. Apparatus for demodulating a modulated curl-free magnetic vector potential field comprising:
   means for detecting said curl-free magnetic vector potential field, said detecting means having an observable property determined by a magnitude of said curl-free magnetic vector potential field; and
   means coupled to said detecting means for determining variations in magnitude of said field from said observable property.

2. The demodulating apparatus of claim 1, wherein said detecting means includes a Josephson junction and wherein said observable property is a change of phase of current through said Josephson junction.

3. The demodulation apparatus of claim 1 wherein said magnitude determination means includes means for relating said observable property and said field magnitude.

4. The demodulation apparatus of claim 1 wherein said magnitude determination means includes apparatus for providing pulse signals, wherein a magnitude of change in said vector field is related to a number of pulse signals.

5. A method for demodulating a modulated curl-free magnetic vector potential field comprising the steps of:
   (a) detecting a change in said curl-free magnetic vector potential field by a means responsive to said vector field, (b) generating a change in an observable quantity related to a magnitude of said vector field by said responsive means; and (c) determining said vector field change from said observable quantity change.

6. The method of demodulation of a curl-free magnetic vector potential field of claim 5 wherein step of determining includes the step of generating pulse signls, the number of pulse signals related to said observable quantity change.

* * * * *